United States Patent Office 3,037,959
Patented June 5, 1962

---

3,037,959
COATING COMPOSITION COMPRISING A POLY-
VINYL ACETAL, A MELAMINE-ALDEHYDE
RESIN AND A POLYURETHANE, PROCESS FOR
PREPARING SAME, AND ELECTRICAL CON-
DUCTOR COATED THEREWITH
Edward Lavin, Longmeadow, and Albert H. Markhart,
Wilbraham, Mass., assignors, by mesne assignments, to
Phelps Dodge Copper Products Corporation, New York,
N.Y., a corporation of Delaware
No Drawing. Filed June 29, 1959, Ser. No. 823,342
14 Claims. (Cl. 260—45.2)

This invention relates to polyvinyl acetal compositions especially adapted to serve as electrical insulation for metals. More particularly, the invention relates to compositions of polyvinyl acetals reacted with certain polyurethanes and melamine resins and to wires coated with these compositions.

Polyvinyl acetals modified with phenolic resins are well known, being used extensively as coatings in various applications such as can linings and as electrical insulation. They are also used as structural adhesives, particularly as taught by de Bruyne in U.S. Patent 2,499,134. A delicate balance of many varied properties is required for these applications and much work has been done to improve the characteristics desired since the formulations were first shown by Jackson and Hall in U.S. Patent 2,307,588.

Some recent work is disclosed by Daszewski in U.S. Patent 2,730,466, Emig et al. in U.S. Patent 2,668,157 and Anderson in U.S. Patent 2,574,313. Most of the new compositions have included extremely minor amounts of various additives to improve the preferred commercial compositions comprising generally 100 parts of polyvinyl acetal and 50 parts of phenolic resin.

The polyvinyl acetals have also been reacted with certain polyurethanes, such as taught in Australian Patent 206,454, issued February 20, 1957.

Although the above mentioned compositions have been satisfactory as insulative coatings possessing the required thermal and solvent resistance necessary in certain instances, they have failed to possess all of the many varied properties required for insualtion in hermetically sealed motors for application in which monochlorodifluoromethane (Refrigerant–22) is commonly used as a refrigerant. To meet commercial acceptance in this application it is required that the solvent resistance of the coating to the liquid refrigerant when measured by the extractibles from the coating, be less than 1%. It is further required that the solvent resistance of the coating to other common solvents, for example toluene and methanol again as measured by extractibles, be also in such minor amounts. In other properties such as dielectric strength, dielectric life at elevated temperatures, abrasion resistance, cut through temperature, thermal shock and flexibility there are specified minimum values below which the particular coating will not be commercially acceptable. The applicants have found, unexpectedly, that certain modified polyvinyl formal compositions possess the necessary improved solvent resistance to toluene, methanol and chlorodifluoromethane along with the other required properties for commercial acceptance.

An object of this invention is to provide crosslinked polyvinyl acetal compositions with improved resistance to various organic solvents, particularly monochlorodifluoromethane.

Another object is to provide coating compositions with improved stability as measured by loss of flexibility and dielectric strength after thermal aging.

A particular object of this invention is to provide improved wire enamels for use as electrical insulation.

These and other objects are obtained with coating compositions comprising, 100 parts polyvinyl acetal, 20–200 parts of a polyurethane and 0.5–20 parts of a melamine resin.

This inveniton is illustrated in its preferred embodiment in the following examples and subsequent discussions thereon, but is not limited thereto. Where parts and percentages are shown hereinafter in the specification and in the claims, they are parts and percentages by weight unless otherwise specified.

EXAMPLE 1

A polyvinyl formal resin was used having the following analysis:

10½% acetate groups calculated as polyvinyl acetate
6% hydroxyl groups calculated as polyvinyl alcohol
83½% formal groups calculated as polyvinyl formal (by difference)

100 parts of this resin together with 60 parts of a polyurethane represented by the formula

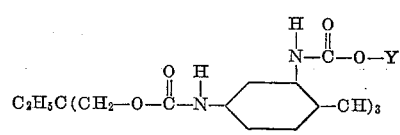

where Y is a phenyl group, along with 10 parts of a melamine-formaldehyde condensate resin, added as a 67 percent solution in butanol, were added to a solvent mixture comprising 440 parts of naphtha and 255 parts of cresylic acid. The resin additions were made in a suitable container at room temperature with moderate agitation. An amber colored solution was obtained having a total solids of approximately 18 percent and a viscosity of 50 poises at 25° C.

Six coats of this enamel were applied to No. 18 magnet wire by running the wire through the solution by conventional means. After each coating, the wire was passed through a vertical oven 12 feet high at a speed of approximately 14 feet per minute, the hottest portion of the oven being approximately 4 feet long and having a temperature of about 350° C. The increase in thickness of the wire due to the insulative coating was approximately 2.9 mils total build. Enameled wires were prepared according to Example 1 having the composition shown below in Examples 2-11 (Table 1).

*Table 1*

|  | Examples | | | | | | | | | |
|---|---|---|---|---|---|---|---|---|---|---|
|  | 2 | 3 | 4 | 5 | 6 | 7 | 8 | 9 | 10 | 11 |
| Polyvinyl formal of Example 1 | 100 | 100 | 100 |  |  | 100 | 100 | 100 | 100 | 100 |
| Polyvinyl formal "A" |  |  |  | 100 |  |  |  |  |  |  |
| Polyvinyl butyral |  |  |  |  | 100 |  |  |  |  |  |
| Polyurethane of Example 1 |  | 60 |  | 60 | 60 |  | 60 | 60 | 60 | 60 |
| Polyurethane "A" |  |  |  |  |  | 60 |  |  |  |  |
| Melamine of Ex. 1 |  |  | 5 | 10 | 10 | 10 |  |  | 5 | 15 |
| Melamine "A" |  |  |  |  |  |  | 10 |  |  |  |
| Melamine "B" |  |  |  |  |  |  |  | 10 |  |  |
| Phenol-aldehyde | 50 | 10 | 50 |  |  |  |  |  |  |  |

The polyvinyl formal "A" resin differs from the polyvinyl formal used in Example 1 in having been stabilized with an alkali hydroxide rather than ammonia. Also, 0.01 part of butyl acid phosphate was added to improve the cure reaction.

The polyvinyl butyral used had the following analysis: 2% acetate groups (calculated as polyvinyl acetate), 12% hydroxyl groups (calculated as polyvinyl alcohol) and 88% acetal groups (calculated by difference and as polyvinyl butyral).

The melamine resin of Example 1 was a relatively low molecular weight butylated internally plasticized condensation product of 1 mol melamine, with 3.5 mols of formaldehyde and 0.5 mol para-toluene sulfonate.

The melamine "A" resin was the co-condensation product of melamine, formaldehyde and butanol.

The melamine "B" resin was the co-condensation product of melamine, formaldehyde and isobutanol.

Polyurethane "A" is the phenolic adduct of the trimer of tolylene diisocyanate.

The phenolic resin was a soluble, fusible, heat-hardenable cresol-formaldehyde reaction product dissolved in an equal weight of cresylic acid.

The enameled wires of Examples 1-11 passed the standards of the National Electrical Manufacturers Association (NEMA) for polyvinyl acetal magnet wire as to abrasion resistance, cut through temperature and dielectric strength. Results of other standard tests on these coated wires are shown in Table 2.

of the coated wire at 160° C. and determining the number of hours at which cracking or crazing occurs in the coating when wound around circular mandrels whose diameters were 3 times the diameter of the wire. If the coated wire could not be flexed around the 3 diameter mandrel after a period of heat aging without the occurrence of cracking in the coating, the coating was considered to have failed and the flexlife reported is the time of heating before such failure occurs.

*Toluene methanol extractibles.*—Weighed specimens are immersed successively in boiling reagent grade toluene and reagent grade methanol for a period of 2 hours immersion in each solvent. The samples are then dried and re-weighed, whereupon the amount of coating which has been extracted during the successive immersions is calculated and reported on a percent weight loss basis.

*Monochlorodifluoromethane extractibles.*—Weighed specimens were immersed in the liquid refrigerant for a period of 16 hours. The immersion was conducted in a bomb in order to keep the normally gaseous refrigerant in a liquid state, and the test conditions for the bomb were 205 to 240 p.s.i. and 37 to 43° C. The test specimens were removed after the immersion period, dried and re-weighed. The amount of extractibles obtained from the coating were calculated on a percent weight loss basis.

The resinous compositions of this invention are the heat cured solid reaction products of 100 parts by weight of a polyvinyl acetal, 20-200 parts of a polyurethane, and 0.5 to 20 parts of a melamine resin. For the best balance of properties required for insulative wire coating compositions, it is preferred to react 100 parts of a poly-

*Table 2*

| Properties | Examples | | | | | | | | | | |
|---|---|---|---|---|---|---|---|---|---|---|---|
|  | 1 | 2 | 3 | 4 | 5 | 6 | 7 | 8 | 9 | 10 | 11 |
| 1 KV-life at 200° C. (hours) | 161 | 101 | 115 | 99 |  |  |  |  |  | 146 | 146 |
| 3 dia. flexlife at 160° C. (hours) | 12 | 18 | 18 | 18 |  |  |  |  |  | 31 | 31 |
| Toluene-methanol extractibles (percent) | 0.6 | 4.0 | 1.6 | 2.4 | 1.0 | 1.7 | 2.1 | 0.5 | 0.4 | 1.2 | 0.2 |
| Chlorodifluoromethane extractibles (percent) | 0.9 | 1.8 | 1.3 | 1.4 |  |  |  |  |  | 0.9 | 0.9 |
| Build (mils) | 2.8 | 3.0 | 2.8 | 3.0 | 2.9 | 2.9 | 2.9 | 2.9 | 2.9 | 2.9 | 2.9 |

*Build.*—The addition to the diameter of the bare wire, in thousandths of an inch, was measured by means of a micrometer caliper.

*1 kv.-life test.*—The 1 kv.-life test was made in accordance with the provisions of the A.I.E.E. (American Institute of Electrical Engineers) specifications No. 57, dated October 1955. The test is a measure of the period for which a coating can be exposed at the particular temperature indicated before it will fail as electrical insulation upon the application of 1000 volts to the sample.

*3 dia. flexlife at 160° C.*—The flexibility of these coatings on heat aging was determined by storing samples vinyl formal with 40-80 parts of the polyurethane, and 1-10 parts of the melamine-formaldehyde condensate resin.

The polyurethane materials of this invention are adducts of organic polyisocyanates, having the isocyanate groups reacted with the reactive hydrogen of another organic compound. The adduct portion of the polyurethane is removed by the elevated temperatures of the cure reaction, permitting the remaining polyisocyanate to crosslink the resinous composition.

Suitable polyisocyanates include compounds such as phenylene diisocyanates, diphenylene diisocyanates, tolylene diisocyanates, naphthylene diisocyanates, diphenylmethane diisocyanates, cyclohexane diisocyanates, ethylene diisocyanate, tetramethylene diisocyanate, hexamethylene diisocyanate, polyaryl polyisocyanates, trimers of polyisocyanates, polyisocyanates which are the reaction products of diisocyanates or triisocyanates with polyhydric alcohols, and the like, and mixtures, trimers and isomers thereof. The simplest class of useful polyisocyanates can be represented by the following formula:

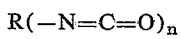

where R represents a member of the class consisting of aliphatic hydrocarbons containing up to 8 carbon atoms, aromatic hydrocarbons containing up to 13 carbon atoms, alicyclic hydrocarbons containing up to 6 carbon atoms, and alkyl-aryl substitutes thereof, and $n$ is an integer from 2–4. Typical trimers of the useful polyisocyanates can be illustrated by the following general formula:

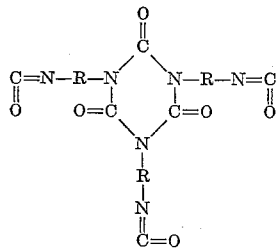

where R is the same as defined in the above formula for the polyisocyanates. Typical examples of the reaction products of polyisocyanates with polyhydric alcohols can be illustrated by the following general formula:

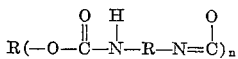

where R is the same as defined in the above formula for the polyisocyanates and $n$ is an integer from 2–10. Suitable reactive hydrogen containing compounds combining with the polyisocyanates to form the desired polyurethanes include phenols such as, phenol, cresol, xylenols, etc. secondary aromatic amines, alcohols (mono- and poly-functional), amides, lactams, mercaptans, enols and the like. Mixtures thereof can also be used to block the polyisocyanates. The preferred blocking agents are compounds with the hydroxyl group attached to the aromatic ring.

The preferred polyurethanes may be prepared by reacting the monohydric phenol with the reaction product of a polyhydric alcohol and an arylene diisocyanate. The polyhydric alcohols are in general preferably limited to compounds containing not more than 16 carbon atoms. For use in wire enamels, the polyhydric alcohols should contain preferably not more than 10 carbon atoms. Examples of these alcohols are, ethylene glycol, propylene glycol, glycerol, trimethylol propane, pentaerythritol, one of the isomeric hexanetriols, etc. The monohydric phenol may be an aryl compound such as phenol, cresols, xylenols and ethyl phenol. This class of preferred polyurethanes can be represented by the general formula:

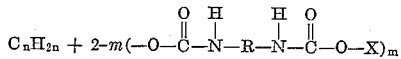

where R represents a member of the class consisting of phenylene, methyl phenylene, dimethyl phenylene, naphthylene and methyl naphthylene group, X represents a member of the class consisting of phenyl and alkyl phenyl groups, said alkyl groups containing 1–6 carbon atoms, $m$ is an integer greater than 1 but no greater than $n$, and $n$ is an integer from 2–10.

The polyvinyl acetals useful in this invention are obtained by reacting polyvinyl alcohol or a partially hydrolyzed polyvinyl ester with an aldehyde, especially formaldehyde. Polyvinyl formals contain a certain number of hydroxyl groups and may contain a certain number of ester groups depending upon the extent of the hydrolysis and the acetalation reactions. The preferred polyvinyl formal resins contain on a weight basis, 1–35% ester groups calculated as polyvinyl ester, 3–15% hydroxyl groups calculated as polyvinyl alcohol and the balance substantially formaldehyde acetal. In the commercial polyvinyl formals, the ester groups are acetate groups. Other polyvinyl acetals such as the reaction product of hydrolyzed polyvinyl esters with acetaldehyde, propionaldehyde, butyraldehyde and benzaldehyde, may also be reacted with the polyurethanes of this invention.

The melamine resins which may be used in the present wire enamel compositions can be selected from the general class of resinous aldehyde condensation products of melamine which are soluble in the organic liquids employed as solvents for the resinous components of the enamel. The useful melamine compounds include such derivatives of melamine as melam and melem. The aldehyde condensation products are well known and may be formed by reacting from 1–6 mols of the aldehyde with 1 mol of melamine. The solubility of the melamine-aldehyde condensation product is generally obtained by further reacting the condensation product with an alcohol or by co-condensing the melamine and aldehyde in the presence of an alcohol.

The aldehydes which may be used are aliphatic, aromatic cyclic and heterocyclic aldehydes including formaldehyde, acetaldehyde, propionaldehyde, butyraldehyde, isobutyraldehyde, valeraldehyde, octaldehyde, benzaldehyde, cinnamaldehyde, cyclohexanone, furfural, etc.

The alcohols which may be used include aliphatic, cycloaliphatic, aromatic, nitro, and amino alcohols such as methanol, ethanol, propanol, isopropanol, butanol, isobutanol, pentanols, octanols, lauryl alcohol, cetyl alcohol, stearyl alcohol, cyclohexanol, benzyl alcohol, cinnamyl alcohol, allyl alcohol, 2-nitro-1-butanol, 2-nitro-2-methyl-1-propanol, 2-nitro-2-methyl-1,3-propane diol, 2-nitro-2-ethyl-1,3-propane, diol, tris (hydroxy methyl) nitro methane, 2-amino-1-butanol, 2-amino-2-methyl-1-propanol, 2-amino-2-methyl-1,3-propane diol, 2-amino-2-ethyl-1,3-propane diol, tris (hydroxy methyl) amino methane etc. Mixtures of two or more alcohols may be used if desired. The amounts of alcohol reacted are generally equal to or in excess of the formaldehyde on a molar ratio.

The preferred melamine resins are the further reaction products of the melamine, aldehyde and alcohol reactants with an aryl sulfonamide. These products are also well known and may be obtained by co-condensation of all the reactants named such as taught in U.S. 2,508,-875, which is hereby incorporated by reference. The useful aryl sulfonamides include benzene sulfonamide and the ring-substituted derivatives thereof, such as toluene sulfonamides, chlorobenzene sulfonamides, nitrobenzene sulfonamides, etc.

For reasons of economy and availability it is preferred to use the co-condensation products of melamine, toluene sulfonamide, butanol and formaldehyde. The proportions of reactants may be varied between the limits of 1 mol of melamine to from 0.1 to 1.0 mol of toluene-sulfonamide and from 1 to 6 or more mols of formaldehyde. An excess of the formaldehyde may be used. The toluene-sulfonamide may be any of the isomeric ortho, meta- or para-derivatives or it may be a mixture of two or more of the isomers.

To be used as a coating composition, the polyvinyl acetals, polyurethanes and melamine resins should be dissolved in a substantially anhydrous organic solvent medium. Any non-reactive volatile mutual solvents for the resinous components may be used, such as ethylene dichloride, trichloroethylene or mixed solvent systems of alcohols, esters and hydrocarbons. For the coating of magnet wire, the solvent medium preferably contains a substantial amount of a phenol such as phenol, cresols, xylenols, and an aliphatic or aromatic hydrocarbon such as xylene, naphtha and mixtures such as the high solvency petroleum hydrocarbons used in the examples. The particular naphtha hydrocarbon mixture used in the preceding examples for the preparation of the wire enamels is a mixture of aromatic liquid hydrocarbons of boiling range 150–184° C. derived from coal tar and/or petroleum. The cresylic acid that was used is a mixture of liquid phenolic compounds consisting primarily of xylenols and cresols and having a boiling range of 195–227° C.

The wire enamels of the present invention are stable indefinitely under usual storing conditions. Further, no initiator other than heat is required to accomplish the reaction of the resins. The reaction initiates at temperatures of about 150° C. with the reaction proceeding more rapidly as the temperatures increase. In the commercial type wire towers generally employed for wire enameling, it is preferred to conduct the reaction at tower operating temperatures of approximately 300 to 450° C.

The resins of this invention form valuable insulative coatings both on magnet wire and in other applications such as for example foil condensers. These coatings are smooth, glossy, tough, adhere well to metals, are resistant to solvents and abrasion, and are superior to conventional wire enamels in hermetic applications.

It is to be understood that the present invention is not limited to the particular wire coating compositions, applications or wire sizes described above. It is obvious from the above test results that it is possible to utilize the present coating compositions as the base coat on a wire and to apply as an overcoat one or more of the many compatible insulating varnishes and thereby obtain a coating acceptable at even higher operating temperatures. It is also obvious that the present enamels may be applied as the varnish over a base coat of less thermally resistant and solvent resistant coatings. Nor is it intended to limit the application of the resin as an electrical insulation for wire merely. The solid resinous constituents of the present invention are definitely stable as a dry mixture at room temperature.

It is possible therefore by means of extrusion, dipping, casting and other known means to form insulation from such a mixture that is useful in such electrical applications as slot liners, encapsulation, sheet insulation, and surface coatings. The coating compositions shown can also be used as an adhesive or impregnating varnishes for such articles as glass tapes and electrical coils. Other non-electrical uses of the compositions are apparent where chemical resistance and temperature stability of the final product are needed, such as surface coatings and others.

It will be obvious to the man skilled in the art that other compositions and applications are within the scope of this invention.

What is claimed is:

1. A coating composition comprising an organic liquid solution of 100 parts of a polyvinyl acetal, 0.5–20 parts of a melamine-aldehyde condensate resin and 20–200 parts of a polyurethane, which polyurethane consisting of the blocked adduct of an organic polyisocyanate with a reactive hydrogen containing compound taken from the group consisting of phenols, secondary aromatic amines, alcohols, amides, lactams, mercaptans, enols and mixtures thereof.

2. A coating composition as in claim 1 wherein the polyvinyl acetal is polyvinyl formal.

3. A coating composition comprising an organic liquid solution of 100 parts of polyvinyl formal, 0.5–20 parts of a melamine-aldehyde condensate resin and 20–200 parts of a polyurethane represented by the formula

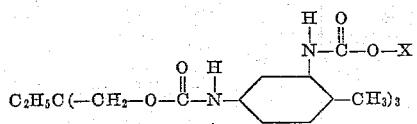

where Y is a member selected from the class consisting of phenyl, methyl phenyl and dimethyl phenyl groups.

4. A composition comprising the product of heating to at least 150° C. 100 parts of a polyvinyl acetal, 0.5–20 parts of a melamine-aldehyde condensate resin and 20–200 parts of a polyurethane, which polyurethane consisting of the blocked adduct of an organic polyisocyanate with a reactive hydrogen containing compound taken from the group consisting of phenols, secondary aromatic amines, alcohols, amides, lactams, mercaptans, enols and mixtures thereof.

5. A composition as in claim 4 wherein the polyvinyl acetal is polyvinyl formal.

6. A composition comprising the product of heating to at least 150° C. 100 parts of polyvinyl formal, 1–10 parts of a melamine-aldehyde condensate resin and 40–80 parts of a polyurethane, which polyurethane consisting of the blocked adduct of an organic polyisocyanate with phenol.

7. A composition comprising a reaction product of heating at temperatures over 150° C. an organic liquid solution containing 100 parts of polyvinyl formal, 1–10 parts of a melamine-aldehyde condensate resin, and 40–80 parts of a polyurethane represented by the formula

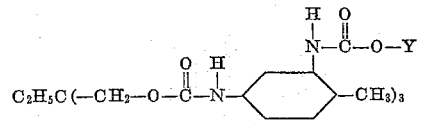

where Y is a member selected from the class consisting of phenyl, methyl phenyl and dimethyl phenyl groups.

8. A composition comprising the reaction product of heating at temperatures over 150° C. an organic liquid solution containing 100 parts of polyvinyl formal, 5 parts of a melamine-formaldehyde condensate resin and 60 parts of a polyurethane represented by the formula

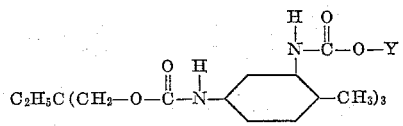

where Y is a member of the class consisting of phenyl, methyl phenyl and dimethyl phenyl groups.

9. A process for preparing a resinous composition which comprises heating at a temperature about 150° C. an organic liquid solution containing 100 parts of polyvinyl formal resin, 0.5–20 parts of a melamine-aldehyde condensate resin and 20–200 parts of a polyurethane, which polyurethane consisting of the blocked adduct of an organic polyisocyanate with a reactive hydrogen containing compound taken from the group consisting of phenols, secondary aromatic amines, alcohols, amides, lactams, mercaptans, enols and mixtures thereof.

10. A process for insulating wire which comprises coating the wire with an organic liquid solution comprising 100 parts of polyvinyl formal, 0.5–20 parts of a melamine-formaldehyde condensate resin and 20–200 parts of a polyurethane, which polyurethane consisting of the blocked adduct of an organic polyisocyanate with phenol, and thereafter simultaneously removing the solvent from the coating and curing the coating on the wire at a temperature of at least 150° C.

11. Electrical insulation comprising the product of heating at above 150° C. 100 parts of polyvinyl formal, 0.5–20 parts of a melamine-aldehyde condensate resin and 20–200 parts of a polyurethane, which polyurethane consisting of the blocked adduct of an organic polyisocyanate with a reactive hydrogen containing compound taken from the group consisting of phenols, secondary aromatic amines, alcohols, amides, lactams, mercaptans, enols and mixtures thereof.

12. An electrical conductor insulated with an organic insulation comprising the product of heating at above 150° C. 100 parts of a polyvinyl formal, 0.5–20 parts of a melamine-aldehyde condensate resin and 20–200 parts of a polyurethane, which polyurethane consisting of the blocked adduct of an organic polyisocyanate with a reactive hydrogen containing compound taken from the group consisting of phenols, secondary aromatic amines, alcohols, amides, lactams, mercaptans, enols and mixtures thereof.

13. A coated electrical conductor consisting of a bare metal wire and a coating comprising the product of heating at temperatures of at least 150° C. 100 parts of polyvinyl formal, 0.5-20 parts of a melamine-formaldehyde condensate resin and 20-200 parts of a polyurethane, which polyurethane consisting of the blocked adduct of an organic polyisocyanate with phenol.

14. An electrically insulating varnish comprising the composition of claim 1.

References Cited in the file of this patent

UNITED STATES PATENTS

| 2,326,698 | Swain et al. | Aug. 10, 1943 |
| 2,409,548 | Debacher | Oct. 15, 1946 |
| 2,454,678 | Smith et al. | Nov. 23, 1948 |

FOREIGN PATENTS

| 206,454 | Australia | Feb. 20, 1957 |

UNITED STATES PATENT OFFICE
CERTIFICATE OF CORRECTION

Patent No. 3,037,959                          June 5, 1962

Edward Lavin et al.

It is hereby certified that error appears in the above numbered patent requiring correction and that the said Letters Patent should read as corrected below.

In the grant, lines 2, 3 and 4, for "assignors, by mesne assignments, to Phelps Dodge Copper Products Corporation, of New York, N. Y., a corporation of Delaware," read -- assignors, by direct and mesne assignments, of one-half to Shawinigan Resins Corporation, of Springfield, Massachusetts, a corporation of Massachusetts, and one-half to Phelps Dodge Copper Products, of New York, N. Y., a corporation of Delaware, --; line 13, for Phelps Dodge Copper Products Corporation, its successors" read -- Shawinigan Resins Corporation and Phelps Dodge Copper Products, their successors --; in the heading to the printed specification, lines 8 to 10, for "assignors, by mesne assignments, to Phelps Dodge Copper Products Corporation, New York, N. Y., a corporation of Delaware" read -- assignors, by direct and mesne assignments, of one-half to Shawinigan Resins Corporation, Springfield, Mass., a corporation of Massachusetts, and one-half to Phelps Dodge Copper Products, New York, N. Y., a corporation of Delaware --; column 5, lines 34 to 35, the structural formula should appear as shown below instead of as in the patent:

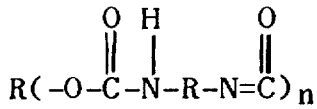

column 6, line 38, after "propane" strike out the comma; line 62, for "ortho," read -- ortho-, --; column 7, lines 68 to 71, the extreme right-hand portion of the formula for "X" read -- Y --.

Signed and sealed this 4th day of September 1962.

(SEAL)
Attest:

ERNEST W. SWIDER                          DAVID L. LADD
Attesting Officer                      Commissioner of Patents